United States Patent
Bryce (10) Patent No.: US 8,522,640 B2
(45) Date of Patent: Sep. 3, 2013

(54) LIGHTWEIGHT CANTILEVER CONTROL SYSTEM

(75) Inventor: Warwick W. Bryce, Ashburton (AU)

(73) Assignee: GM Global Technology Operations LLC, Detroit, MI (US)

( * ) Notice: Subject to any disclaimer, the term of this patent is extended or adjusted under 35 U.S.C. 154(b) by 1159 days.

(21) Appl. No.: 12/261,080

(22) Filed: Oct. 30, 2008

(65) Prior Publication Data

US 2010/0107805 A1    May 6, 2010

(51) Int. Cl.
| G05G 1/04 | (2006.01) |
| G05G 1/46 | (2008.04) |
| B60T 7/04 | (2006.01) |
| B60T 7/06 | (2006.01) |
| G05G 1/30 | (2008.04) |
| G05G 5/03 | (2008.04) |

(52) U.S. Cl.
CPC . *B60T 7/042* (2013.01); *B60T 7/06* (2013.01); *G05G 1/30* (2013.01); *G05G 5/03* (2013.01)
USPC .............. 74/512; 74/513; 74/514; 74/519; 74/560

(58) Field of Classification Search
USPC ..... 74/512–514, 560; 29/897.2; 73/862.382; 200/462
See application file for complete search history.

(56) References Cited

U.S. PATENT DOCUMENTS

| 2,779,209 A | * | 1/1957 | Estes et al. ........................ 74/512 |
| 4,300,409 A | * | 11/1981 | Leighton ........................... 74/512 |
| 4,431,884 A | * | 2/1984 | Flumignan et al. ........... 200/462 |
| 4,888,997 A | * | 12/1989 | Eckert et al. ............. 73/862.382 |
| 6,014,862 A | | 1/2000 | Shaw et al. |
| 6,183,050 B1 | | 2/2001 | Ganzel |
| 6,186,026 B1 | | 2/2001 | Shaw et al. |
| 6,298,746 B1 | | 10/2001 | Shaw |
| 6,330,838 B1 | | 12/2001 | Kalsi |
| 6,367,886 B1 | | 4/2002 | Shaw |
| 6,397,468 B2 | * | 6/2002 | Popowich .................... 29/897.2 |
| 6,464,306 B2 | | 10/2002 | Shaw et al. |
| 6,591,710 B1 | | 7/2003 | Shaw |
| 7,213,673 B2 | | 5/2007 | Shabana et al. |

(Continued)

FOREIGN PATENT DOCUMENTS

| DE | 10046256 A1 | 3/2002 |
| DE | 10328554 A1 | 1/2005 |
| DE | 102006035882 A1 | 2/2008 |
| WO | WO2006114075 A1 | 11/2006 |

OTHER PUBLICATIONS

Machine Translation of WO 2006/114075 (Greb et al.).*
Machine Translation of DE 103 28 554 A1 (Kohler et al.).*
"Objective Characterization of Vehicle Brake Feel" by David G. Ebert and Richard A. Kaatz, SAE Technical paper 940331 (Feb. 1994).

(Continued)

*Primary Examiner* — Vinh Luong (57) ABSTRACT

A cantilever control system including: a cantilever control arm having a bifurcated section for its attachment to a stationary structure so as to provide resistance to off-center loading, a springy portion of the cantilever control arm disposed at the bifurcated section whereby spring redundancy is provided, and a rigid section of the cantilever control arm which includes a user interface portion (i.e., a foot pad or hand grip); a diversity of sensors in terms of types and locations; a coarse flexure control in the form of a contoured snubber which tunes the flexing stiffness and cantilever control arm flexure feel; and a plurality of fine flexure controls including at least one of: a flexure hysteresis control, an over-travel stop control, and a pre-load flexure control.

24 Claims, 7 Drawing Sheets

(56) References Cited

U.S. PATENT DOCUMENTS

| | | | |
|---|---|---|---|
| 2001/0015111 A1* | 8/2001 | Rixon et al. | 74/512 |
| 2008/0243323 A1* | 10/2008 | Karnjate et al. | 701/22 |
| 2008/0306667 A1* | 12/2008 | Karnjate et al. | 701/70 |
| 2008/0307921 A1* | 12/2008 | La et al. | 74/513 |

OTHER PUBLICATIONS

Uniaxial ICP (registered TM) Strain Sensor Model 740B04 fact sheet of PCB Piezotronics of Depew, NY 14043, dated Aug. 2007.
German Office Action dated Jul. 20, 2010 for German application 102009050811.2-21, corresponding to U.S. Appl. No. 12/261,080.

* cited by examiner

LIGHTWEIGHT CANTILEVER CONTROL SYSTEM

TECHNICAL FIELD

The present invention relates, in general, to manually operated controls for wireless applications, and more particularly, to manually operated cantilever control systems for by-wire technology.

BACKGROUND OF THE INVENTION

Typical motor vehicles operate by complex mechanical and electromechanical linkages between the driver, or operator, of the vehicle, and the principal components of the motor vehicle, such as the engine and brakes. Efforts to reduce costs and weight of motor vehicles have made it incumbent upon motor vehicle designers to create alternative means of control for the vehicles, which would reduce materials, reduce weight, and enhance safety features.

One alternative to mechanical and electromechanical control systems is known as "by-wire" technology. In by-wire technology, the operator inputs control of the motor vehicle through an interface, typically pedals in the case of brake or throttle controls. The inputs are then transmitted to the underlying controls by electronic or electromagnetic means, rather than by mechanical or electromechanical means.

Through the incorporation of by-wire technologies, motor vehicles no longer require cumbersome mechanical and electromechanical linkages, which results in several advantages. For example, since mechanical linkages are generally bulky and heavy, utilization of by-wire technology has the potential to reduce weight and provide more cabin space. Further, by-wire technology also allows for a more standardized driver control interface, as there is no need to accommodate variations in mechanical linkage packages due to different engines, transmissions and other major components. Additionally, by incorporating microprocessors into the design, additional analysis and control may be added between the driver input and the brake or throttle actuation.

As a result, it is seen that by-wire technology provides an opportunity to redesign and improve driver interfaces. The brake pedal of motor vehicles has received the most attention of these control systems due to the critical nature of this application. Traditionally, the design of the human interface with the braking system has been a subjective endeavor. With the advent of a Brake Feel Index (BFI) as reported in SAE technical paper 940331 "Objective Characterization of Vehicle Brake Feel", a method was developed to correlate objective engineering parameters to these subjective assessments. In the case of BFI, such aspects as pedal application force, pedal travel and pedal preload are compared to desired response. These parameters were determined to match the characteristics of vehicles with mechanical and electromechanical linkages that the drivers were accustomed to for each class or type of vehicle involved.

The operative characteristics of by-wire brake pedals are represented, generally, by U.S. Pat. Nos. 6,186,026; 6,298,746; 6,330,838; 6,367,886; 6,464,306; and 6,591,710. Of particular interest of these is U.S. Pat. No. 6,186,026 which discloses a flexible cantilever pedal lever with an affixed sensor, wherein flexure control is provided by a stationary reaction surface which interacts with the flexure of the pedal lever as driver foot force is applied to foot pad (or pedal pad), wherein the reaction surface contour is tuned to provide emulation the feel of a traditional pivoting brake pedal.

These prior art by-wire brake pedal concepts have the potential to give fuel consumption reduction through mass saving as well as cost saving, but have a number of deficiencies that need to be overcome to enable their wide-spread implementation. For example, the pedal lever is structurally weak at the springy section, which can adversely impact operation of the pedal in the event of off-center application of applied force loads to the foot pad (that is, where pedal torque is present). Also, the pedal lever can lose springiness due to wear, which can cause degraded functionality, especially in the case of panic braking, where excessive loads may be applied to the brake pedal. Further, the prior art by-wire brake pedal concepts do not contain fine flexure control features. In this regard, while known prior art by-wire brake pedals may enable adjustment of the feel of coarse flexure control (i.e., U.S. Pat. No. 6,186,026), there remains the need for provision of fine flexure control.

Accordingly, what remains needed in the art is a cantilever control system, adaptable for by-wire systems, which provides fuel savings from material reduction and overcomes the prior art issues of structural weakness particularly as regards off-center loading, failsafety, excessive loading, and facility for both coarse and fine flexure control.

SUMMARY OF THE INVENTION

The present invention is a cantilever control system, adapted for by-wire systems, which provides fuel savings from material reduction while overcoming the prior art issues associated with structural weakness (in particular off-center loading), failsafety, excessive loading, and provision for both coarse and fine flexure control.

The cantilever control system of the present invention consists of a cantilever control arm and at least one interfaced sensor, wherein the output of the at least one sensor provides a control input to an electronic system (i.e., a by-wire system). By way of example, the electronic system may be a motor vehicle by-wire electronic system, as for example the braking system, but the environment of use of the cantilever control system of the present invention is applicable to other electronic systems of motor vehicles and is further also applicable to the electronic systems of applications other than motor vehicles.

The cantilever control system according to the present invention features a variety of features which enhance its operation. These features include at least one of: a bifurcated, or bifurcated first, section of the cantilever control arm for its attachment to a stationary structure which provides resistance to off-center (eccentric) loading (i.e., pedal torquing), a springy portion of the cantilever control arm disposed at the bifurcated section whereby spring redundancy is provided, and a rigid, or second, section of the cantilever control arm which includes the user interface portion (i.e., a foot pad or hand grip); diversity of sensors in terms of types and locations; coarse, or first, flexure control in the form of a contoured snubber which tunes the cantilever stiffness rate, which is perceived as flexure feel; and a plurality of fine, or second, flexure controls including at least one of: a hysteresis control in the form of a sliding leaf that provides frictional hysteresis of the of cantilever control arm flexure, a stop control which abuttably prevents over-travel of the flexure of the cantilever control arm, and a preload control which provides flexure pre-load of the cantilever control arm.

By way of an implementation exemplification of a by-wire motor vehicle application, the cantilever control arm is a brake pedal including a pedal lever attached to a stationary structure at its bifurcated section and a foot pad disposed remotely therefrom at the rigid section. A number of advantages are provided by this implementation, including the following.

A first advantage is a reduction in weight and cost. The brake pedal is of a single piece construction, for example either molded of composite material or formed of steel, which reduces the cost and complexity of tooling, as well as the primary weight issue. At least one associated sensor senses driver applied flexure of the pedal lever and transmits this information, via for example an electronic control module, to the brake system. This implementation of a by-wire brake pedal eliminates the need for any mechanical linkages between the driver control interface and the underlying braking system.

A second advantage is predictable and repeatable response to an applied force. The springy portion of the pedal lever is calibrated with respect to the surface contouring of the snubber (coarse flexure control) to provide a desired brake pedal feel and deflection correlated to the desired response of the braking system. The bifurcation provides long term consistency and failsafe redundancy of the springiness.

A third advantage of the present invention is stability. The bifurcated section provides an inherent lateral attachment stability which rigidly resists off-center (eccentric) force applications by the driver, that is, applied forces which generate a pedal torque. The effect of an off-center application of force in earlier designs of light weight brake pedal concepts (as for example U.S. Pat. No. 6,186,026), produces a corresponding off-center force component which can produce a wobbly feel to the driver. This wobbly feel creates a perception of a low quality brake pedal. However, the bifurcated section provides stability with respect to off-center force applications, and thereby provides a solid and confident brake pedal feel to the driver.

A fourth advantage of the present invention is fine flexure control. The flexure response of the pedal lever to driver applied force at the foot pad is fine tuned by fine flexure controls. A hysteresis control in the form of a sliding leaf provides flexure hysteresis; a preload control provides flexure preloading; and a stop control provides an over-travel abutment with respect to a stationary structure. These fine flexure controls provide the driver with a feel similar to conventional brake pedals. By incorporation of these fine flexure controls, the present invention may be tuned to meet particular brake feel characteristics in particular motor vehicle applications.

A fifth advantage of the present invention is diversity of sensors. The sensors may by of any of a variety of types, such as strain gauges, tactile sensors, load cells (i.e., capacitive, magnetic, semi-conductor, piezo-electric, etc.), or fluid pressure sensor. Further, the sensors may be disposed in a variety of locations, for example on or in the pedal lever, the snubber or the foot pad. Further, a plurality of sensors provides failsafe redundancy in the event of sensor failure, and sensor diversity facilitates design flexibility.

Additional to the above with respect to conventional vehicles, there is great future potential of the present invention for application to hybrid and electric vehicles. In such applications, the signal would also be used by the ECU or ECM to control the electric motor/generator to provide regeneration braking in addition to normal brake caliper control. The ECU or ECM would then decide how to most efficiently achieve the slowing down of the vehicle, be it through regenerative or friction braking or a combination of these (blend braking). This feature would be extremely cumbersome to arrange with a conventional mechanical brake mechanism.

While the cantilever control system according to the present invention may be utilized in a motor vehicle environment with respect to, for example, the brake, accelerator and clutch pedals, as well as the controls used by physically impaired drivers (i.e., motor vehicle hand and foot controls), the present invention has, in general, a much wider adaptability for use in other environments, such as the hand levers of heavy equipment (i.e., cranes, power shovels, bulldozers, etc.) and the hand controllers of arcade games, to name only a few extra-automotive applications.

Accordingly, it is the object of the present invention to provide a cantilever control system that is lightweight, structurally strong, failsafe, resistant to off-center loading, and has both coarse and fine flexure control.

This and additional objects, features and advantages of the present invention will become clearer from the following specification of a preferred embodiment.

DESCRIPTION OF THE PREFERRED EMBODIMENT

Referring now to the Drawing, examples of cantilever control system according to the present invention are shown. While the drawings principally depict the implementation of the present invention in a motor vehicle environment, it is to be understood that the present invention relates more generally to any environment. The following description of the preferred embodiment is merely exemplary in nature and is not intended to limit the invention, its applications, or its uses.

Figure 1A:
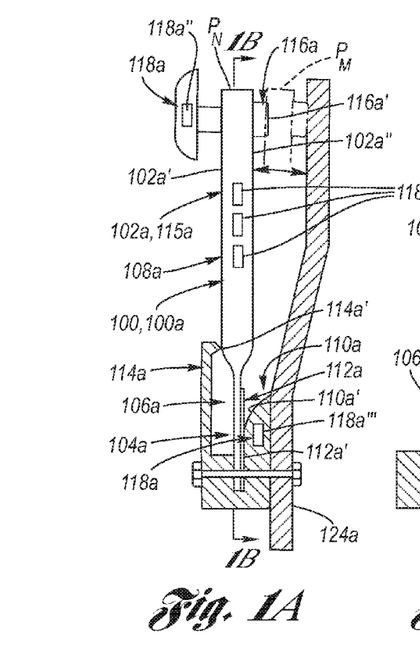
FIG. 1A is a schematic, partly sectional side view of the cantilever control system according to the present invention for a foot pedal application.
Figures 1B, 1C:
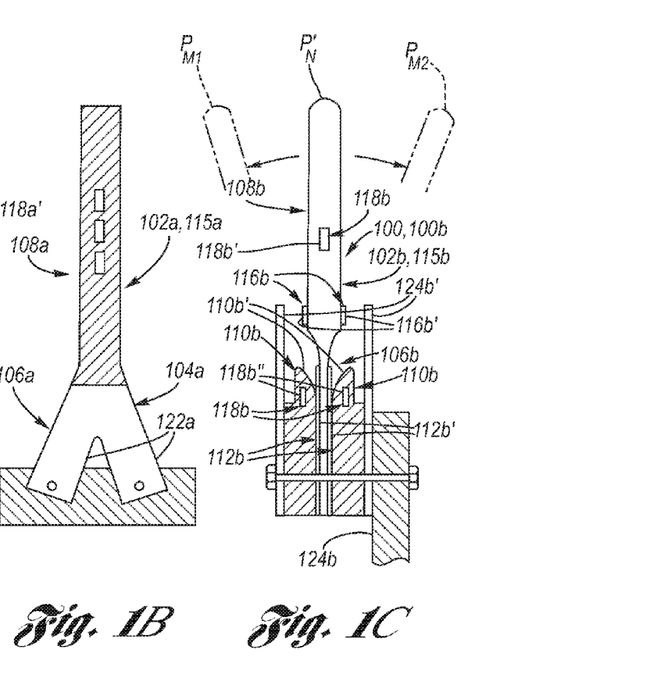
FIG. 1B is a partly sectional view, seen along line 1B-1B of FIG. 1A.
FIG. 1C is a schematic, partly sectional side view of the cantilever control system according to the present invention for a hand lever application.
Figure 1D:
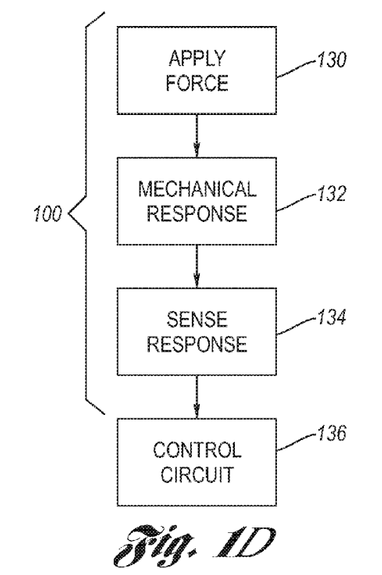
FIG. 1D is flow chart of an example of process steps involved in the operation of the cantilever control system according to the present invention.
Figure 1E:
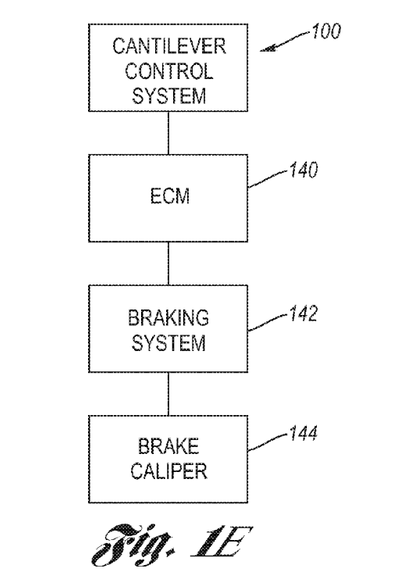
FIG. 1E is an example of a block diagram of an environment of use of the cantilever control system according to the present invention with respect to a braking system.

Turning attention firstly to FIGS. 1A through 1E, an overview of the cantilever control system 100 according to the present invention will be detailed. In this regard, FIGS. 1A and 1C show foot and hand applications, respectively, of the cantilever control system 100, wherein FIG. 1B depicts the bifurcation of the cantilever control arm thereof (shown in a preferred Y-shape, but the shape can be otherwise); FIG. 1D shows an example of process steps associated with using the cantilever control system; and FIG. 1E shows a block diagram of an example of use wherein the cantilever control system is interfaced with an external by-wire system.

At FIG. 1A, the cantilever control system 100 is in the form of a foot pedal 100a of the sort that may be used in automotive and many other applications, wherein the cantilever control arm 102a serves as a pedal lever 115a. The cantilever control arm 102a has a bifurcated section 104a, including a springy portion 106a, and a rigid section 108a. The springy portion 106a allows for flexing from a neutral position $P_N$ to a maximum flexed position $P_M$ (shown in phantom). A snubber 110a has a flexure control surface 110a' which, in combination with the contour surface of the springy portion, provides a desired coarse flexure stiffness rate of the springy portion 106a. Fine flexure control is provided by a hysteresis control 112a, a preload control 114a, and a stop control 116a. The hysteresis control 112a is in the form of a sliding leaf 112a' which provides frictional sliding against the cantilever control arm 102a as it flexes (the friction may be adjusted by choice of material and/or coating of the leaf), thereby providing flexure hysteresis. The preload control 114a is in the form of a preload abutment surface 114a' located on the flexure return side 102a' of the cantilever control arm, which provides flexure preloading of the springy portion; and a stop control 116a in the form a stop abutment surface 116a' located on the flexure side 102a" of the cantilever control arm, which provides an over-travel abutment stop. The stop control 116a is an abutment of the cantilever control arm with respect to a stationary structure 124a, wherein in this regard, preferably, a resilient stop block (shown at 116a') may be located on the cantilever control arm or the stationary structure, wherein the resilience of the stop block allows for a small amount of cantilever control arm travel with forces applied above the maximum at which abutment occurs. A diversity of sensors 118a are provided, by way of example including a plurality of strain gauges 118a' at the rigid section 108a, a pressure sensor 118a" in the foot pad 120a, and another pressure sensor 118a'" in the snubber 110a. Merely by way of example, a suitable sensor is a UNIAXIAL ICP® strain sensor Model number 740B04 available through PCB Piezotronics of Depew, NY 14043.

As can be understood from FIG. 1B, the bifurcated section 104a, provides two separate and mutually spaced apart legs 122a, each having its own separate attachment to a stationary structure 124a and each carrying a separate springy portion 106a. While a Y-shape of bifurcation is shown, it is to be understood that any shape which provides two separate and mutually spaced apart legs connected to the rigid section is included within the meaning of bifurcation, such as for example a U-shape (see FIG. 9). As such, the cantilever control arm 102a is very stable and resistant to off-center (i.e., eccentric) force application which involve pedal torque (see description hereinbelow with respect to FIGS. 2A and 2B). Further the redundancy of springy portions provides a long service life and a failsafe against failure.

At FIG. 1C, the cantilever control system 100 is in the form of a hand control 100b of the sort used in heavy machinery and many other applications, wherein the cantilever control arm 102b serves as a hand lever 115b. The cantilever control arm 102b may or may not have a bifurcated section as shown at FIG. 1B, and has a springy portion 106b connected to a stationary structure 124b, and a rigid section 108b. The cantilever control arm (hand lever) flexes in a flexuring plane (see arrows) between a first maximum flexed position $P_{M1}$, a neutral position $P'_N$ and a second maximum flexed position $P_{M2}$. A pair of snubbers 110b are disposed on opposite sides of the hand lever 115, and each has contours flexure control surfaces 110b' which interface with the contour of the spring portion to provide a desired flexure stiffness rate, serving as coarse flexure controls of the springy portion 106b. Fine flexure control may or may not be provided. If included, preferably provided is a hysteresis control 112b and a stop control 116b. The hysteresis control 112b is in the form of a pair of sliding leafs 112b' which provide frictional sliding against the cantilever control arm 102a as it flexes, thereby providing flexure hysteresis (the friction may be adjusted by choice of material and/or coating of the leafs). The stop control 116b is in the form a pair of stop abutment surfaces 116b' located on each side of the cantilever control arm, and each respectively providing an over travel abutment stop in conjunction with stationary structures 124b', and having preferably resilient stop blocks (shown at 116b'). A diversity of sensors 118b are provided, by way of example including a plurality of strain gauges 118b' at the rigid section 108b and a pressure sensor 118b" in each of the snubbers 110b.

Referring next to FIG. 1D, an example of a methodology of operation of the cantilever control system 100 according to the present invention is depicted. At Block 130 a force by an operator is applied to the cantilever control arm, which is generally done by either the foot or the hand. At Block 132, the cantilever control arm responds to the applied force by resiliently flexing at the springy portion thereof and interacting with the flexure control surface of the snubber, as well as interacting with any present fine flexure controls (i.e., hysteresis, preload and stop). At Block 134, the flexure of the cantilever control arm is sensed by the one or more sensors interfaced with the cantilever control system (i.e., at the cantilever control arm, snubber, etc.). At Block 136, at least one signal provided by the one or more sensors is delivered to an external electronic control (i.e., by-wire) circuit which thereupon performs some operation in precalibrated response to the signal.

Referring now to FIG. 1E, an example of implementation of the methodology of operation at FIG. 1D is depicted. Operator force applied to the cantilever control arm of the cantilever control system 100 provides at least one signal to an electronic control module 140, where the signal is processed and converted into a secondary signal recognizable and implementable to the braking system 142, which in turn applies the brake calipers 144 to the brake rotor, the force of application being in precalibrated response to the flexure of the cantilever control arm. Upon release of the cantilever control arm by the operator, the cantilever control arm resiliently resumes its neutral position and the brake caliper is also released.

Turing attention additionally to remaining FIGS. 2A through 9, examples of a motor vehicle implementation of the cantilever control system 100 according to the present invention will be detailed, keeping in mind this is for exemplary purposes only in that the present invention has wide application beyond motor vehicles.

FIGS. 2A through 3C depict an example of a cantilever control system 100 in the form of a brake pedal 100c, wherein the cantilever control arm 102c is, in turn, in the form of a composite pedal lever 115c which is upper mounted to a stationary structure (i.e., pendulum mounting modality).

Figure 2A:
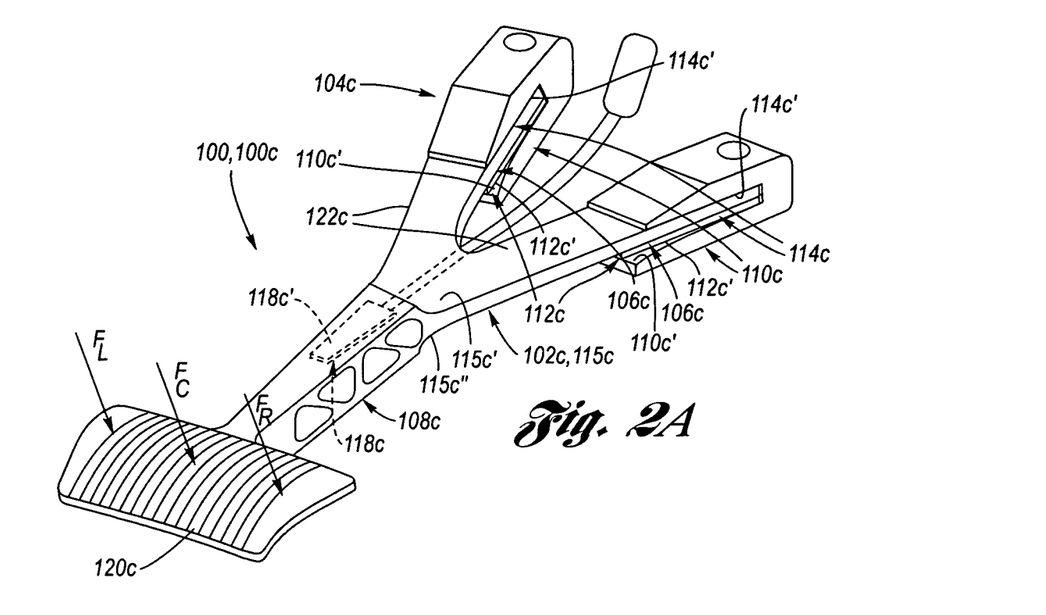
FIG. 2A is a perspective view of a brake pedal form of the cantilever control system, wherein the brake pedal has a composite pedal lever.
Figure 2B:
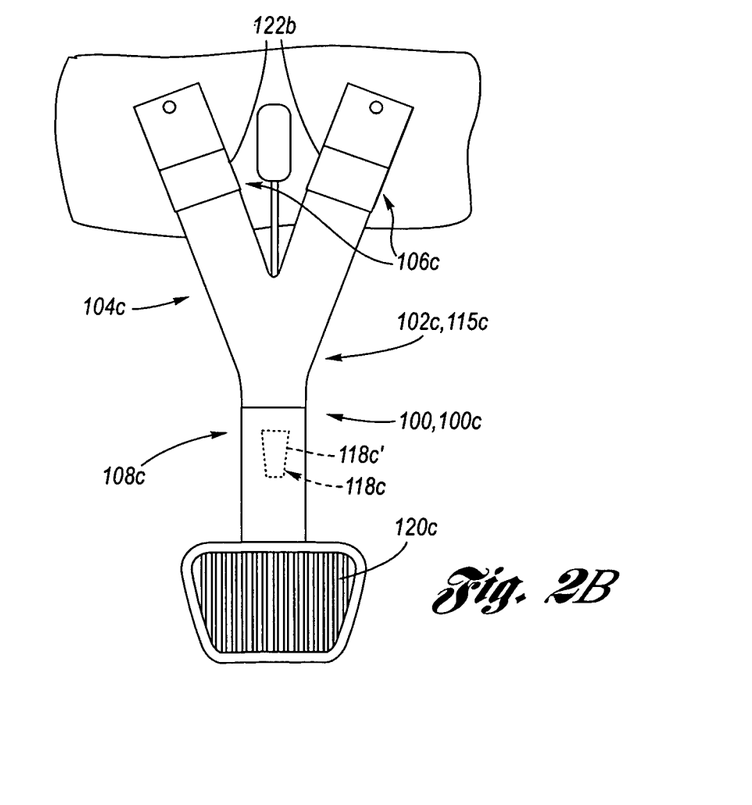
FIG. 2B is a top plan view of the brake pedal of FIG. 2A, shown now in operation attached to an upper stationary structure of a motor vehicle (i.e., pendulum mounting).

As shown at FIGS. 2A and 2B, the pedal lever 115c (the cantilever control arm) has a bifurcated section 104c, including a springy portion 106c, and a rigid section 108c. The bifurcated section 104c provides two separate and mutually spaced apart legs 122c, each having its own separate attachment to a stationary structure 124c and each carrying a separate springy portion 106c. A snubber 110c has a flexure control surface 110c' which serves as a coarse flexure control of the springy portion 106a (at each leg 122c). Fine flexure control is provided by a hysteresis control 112c, a preload control 114c, and a stop control 116c (shown at FIGS. 3A through 3C). The hysteresis control 112c is in the form of a sliding leaf 112c' which provides frictional sliding against the pedal lever 115c as it flexes, thereby providing flexure hysteresis. The preload control 114c is in the form of a preload abutment surface 114c' located on the flexure return side 115c' of the pedal lever 115c, which provides flexure preloading of the springy portion; and the stop control 116c (see FIGS. 3A through 3C) is in the form a stop abutment surface 116c' located on the flexure side 115c'' of the pedal lever 115c, which provides an over travel abutment stop in combination with a stationary structure 124c. The stop control 116c is an abutment of the pedal lever 115c with respect to a stationary structure (i.e., the floor 124c'), wherein in this regard, preferably, a resilient stop block (shown at 116c') may be located on the pedal lever or the stationary structure (see, for example, resilient block abutment surfaces 116i, 116k, 116j of FIG. 9), wherein the resilience of the stop block allows for a small amount of cantilever control arm travel with forces applied above a maximum applied force $F_M$ needed to provide abutment.

Because of the bifurcated section 104c, the pedal lever 115c is very stable and resistant to off-center (i.e., eccentric) force application to the foot pad 120c which involve pedal torque (see off-center left and right force application arrows $F_L$ and $F_R$ on either side of center force application arrow $F_C$ in FIG. 2A). Further the redundancy of springy portions provides a long service life and a failsafe against failure.

The cantilever control system 100 in the form of a brake pedal 102c further includes at least one sensor 118c for sensing the application of force to the foot pad 120c. While a diversity of sensors may be provided, FIGS. 2A and 2B depict, merely by way of example, a single strain gauge 118c' which is attached to, or embedded (i.e., overlmolded) in, the rigid section 108c.

Figures 3A, 3B, 3C:
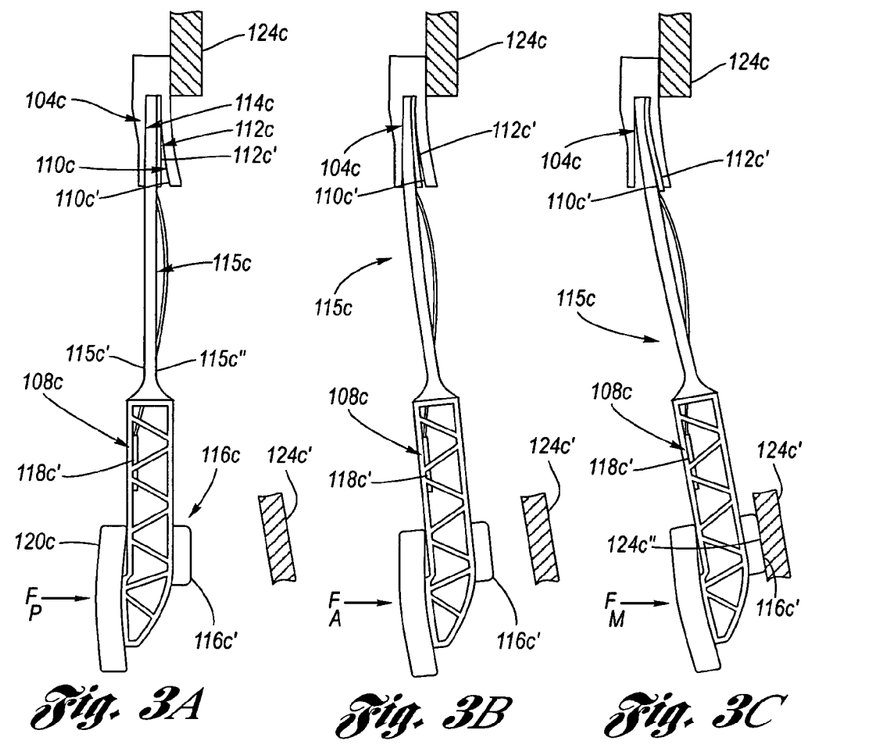
FIGS. 3A through 3C are side views of the brake pedal form of the cantilever control arm as in FIGS. 2A and 2B, illustrating flexure of the pedal lever in response to the application of force by a driver during the normal course of operation.

FIGS. 3A through 3C depict views of progressive flexing of the pedal lever 115c from the neutral position at FIG. 3A to the maximum flexed position at FIG. 3C due to progressive forces applied to the foot pad 120c.

At FIG. 3A, the neutral position, the preload control 114c abuts the pedal lever 115c, whereby the pedal lever is resiliently flexed thereagainst to provide the preloading thereto. The preloading requires that at least a preload force $F_P$ be applied before the pedal lever will flex.

At FIG. 3B, a medial flexed position, an intermediate force $F_A$ is applied to the pedal lever. It will be seen that the hysteresis control 112c undergoes an interaction with the pedal lever, wherein the leaf 112c' frictionally slides against the pedal lever as it also flexes.

Finally, at FIG. 3C, the maximum flexed position, the pivot lever 115c has flexed to its maximum flexed position due to application of at least a maximum force $F_M$, stopped by the stop control 116c via the stop abutment surface 116c' abutting a stationary structure 124c'' of a stationary structure 124c'. The hysteresis control 112c has continued to operate, wherein the leaf 112c' has frictionally slid further against the pedal lever 115c. Upon release of force applied to the foot pedal 150, the pedal lever resiliently returns to the neutral position.

Figure 4:
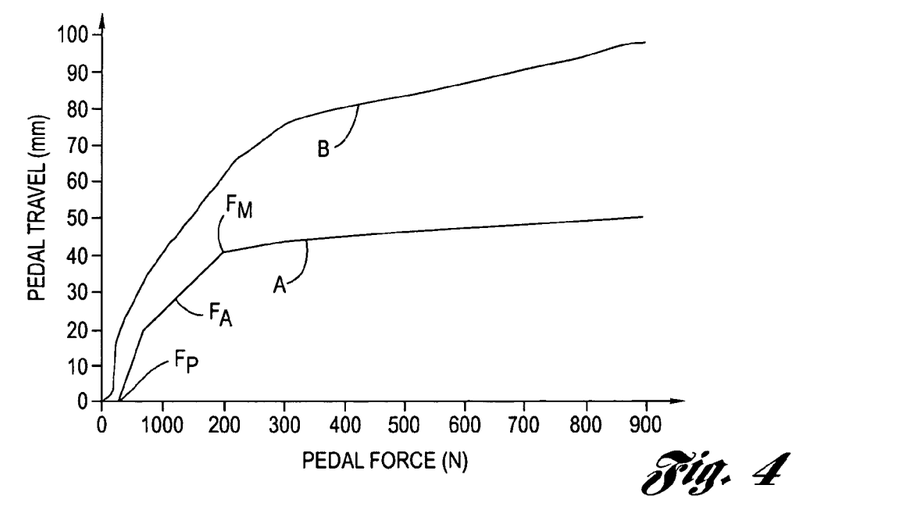
FIG. 4 is a graph of pedal travel versus pedal force, in which plot A is for the cantilever control system of the present invention in the form of a brake pedal, and plot B is for a conventional pivotal brake pedal.

FIG. 4 is a graph of pedal travel versus foot pedal force, wherein plot A is for a cantilever control arm in the form of a brake pedal, and plot B is for a conventional pivoting brake pedal. It will be seen that plot A can be fashioned to mimic plot B, including a preload, $F_P$. Advantageously, the maximum force is limited by the stop control to $F_M$, whereby the pedal lever structure necessary to handle excessive loading, as is required for plot B, is avoided for plot A. The resilience function of the resilient block of the stop control is seen for small pedal travel due to applied force above $F_M$. The present invention eliminates the need for 20 mm of lost travel and reduces the over travel of the pedal system associated with system deflections.

Figure 5:
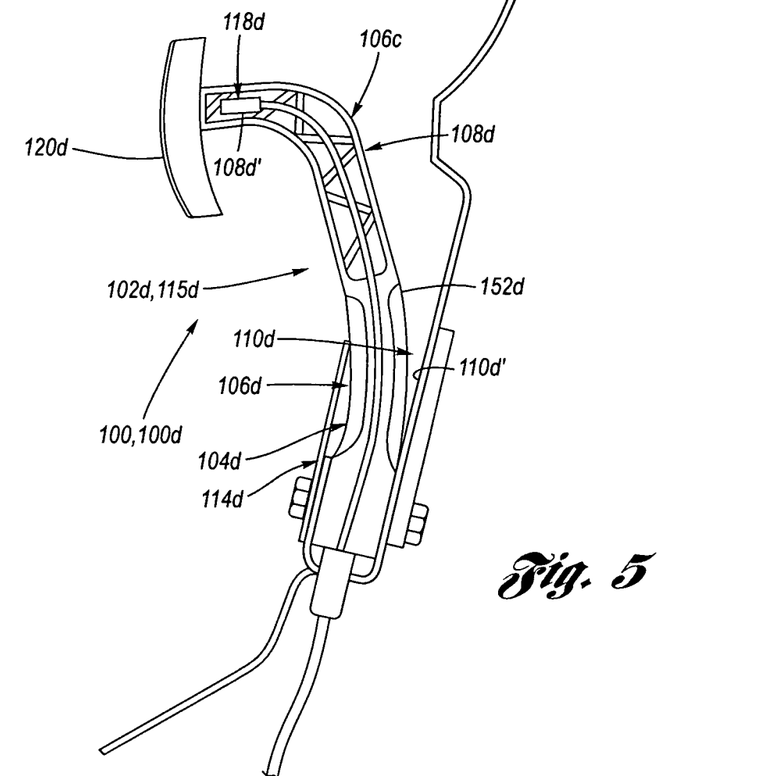
FIG. 5 is a side view of a cantilever control system in the form of a floor mounted brake pedal having a composite pedal lever.

FIG. 5 is an example of a cantilever control system 100 in the form of a brake pedal 100d, wherein the cantilever control arm 102d is, in turn, in the form of a composite pedal lever 115d which is lower mounted to a stationary structure (floor mounting).

The pedal lever 115d (the cantilever control arm) has a bifurcated section 104d (generally similar to that shown at FIGS. 2A and 2B), a curvaceous springy portion 106d, and a curvaceous rigid section 108d. In this embodiment, the snubber 110d has a generally flat contour flexure control surface 110d', and the springy portion has a curved contour, whereby as the springy portion flexes, the flexure control surface interfaces therewith, and the respective contours control the flexure stiffness rate, serving as a coarse flexure control of the springy portion. Fine flexure control is provided by a preload control 114d and a stop control 116d, which operate generally in the manner discussed hereinabove.

The cantilever control system 100 in the form of a brake pedal 102d further includes at least one sensor 118d for sensing the application of force to the foot pad 120d. While a diversity of sensors may be provided, FIGS. 2A and 2B depict, merely by way of example, a single strain gauge 118d' which is attached to, or embedded (i.e., overmolded) in, the rigid section 108d.

Figure 6A:
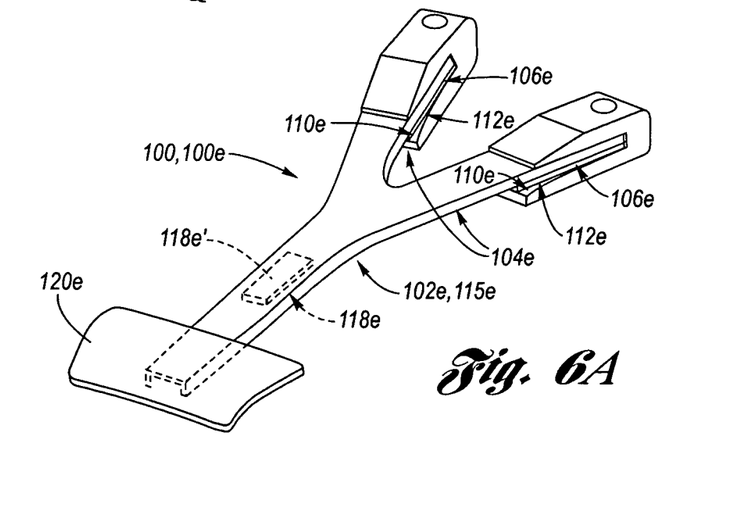
FIG. 6A is a top perspective view of a brake pedal form of the cantilever control system, wherein the brake pedal has a metallic pedal lever.
Figure 6B:
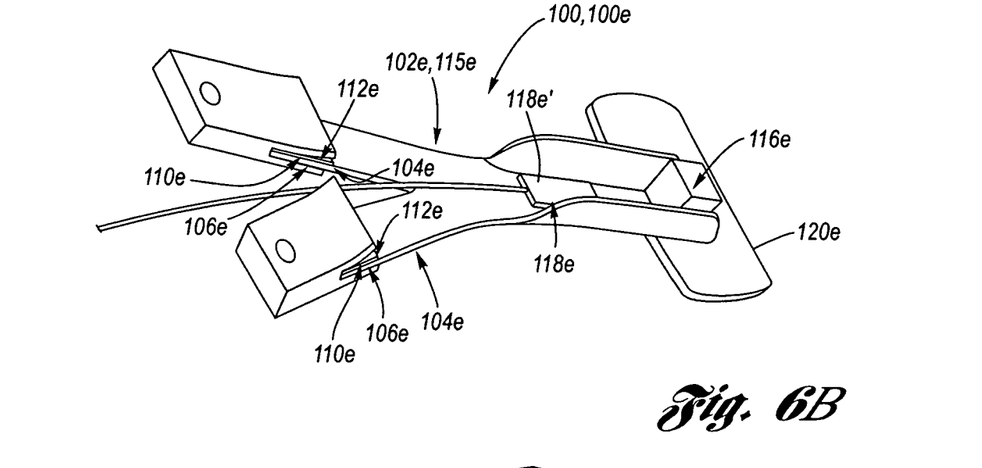
FIG. 6B is a bottom perspective view of the brake pedal of FIG. 6A.

Turning attention next to FIGS. 6A and 6B depicted is an example of a cantilever control system 100 in the form of a brake pedal 100e, wherein the cantilever control arm 102e is, in turn, in the form of a metallic pedal lever 115e which is upper mounted to a stationary structure (i.e., pendulum mounting modality).

The pedal lever 115e (the cantilever control arm) is composed of a metal, by way of preferred example, steel, and has a bifurcated section 104e, including a springy portion 106e, and a rigid section 108e, preferably having a U-shaped cross-section for providing rigidity. The bifurcated section 104e, provides two separate and mutually spaced apart legs 122e, each having its own separate attachment to a stationary structure 124e and each carrying a separate springy portion 106e.

A snubber 110e has a flexure control surface 110e' which serves as a coarse flexure control of the springy portion 106e (at each leg 122e). Fine flexure control is provided by a hysteresis control 112e, a preload control 114e, and a stop control 116e, details of which are generally as described hereinabove with respect to FIGS. 2A through 3C.

Because of the bifurcated section 104e, the pedal lever 115e is very stable and resistant to off-center (i.e., eccentric) force application to the foot pad 120e in the manner shown at FIG. 2A. Further, the redundancy of springy portions provides a long service life and a failsafe against failure.

The cantilever control system 100 in the form of a brake pedal 102e further includes at least one sensor 118e for sensing the application of force to the foot pad 120e. While a diversity of sensors may be provided, merely by way of example, a single strain gauge 118e' is attached to the rigid section 108e.

Figure 7A:
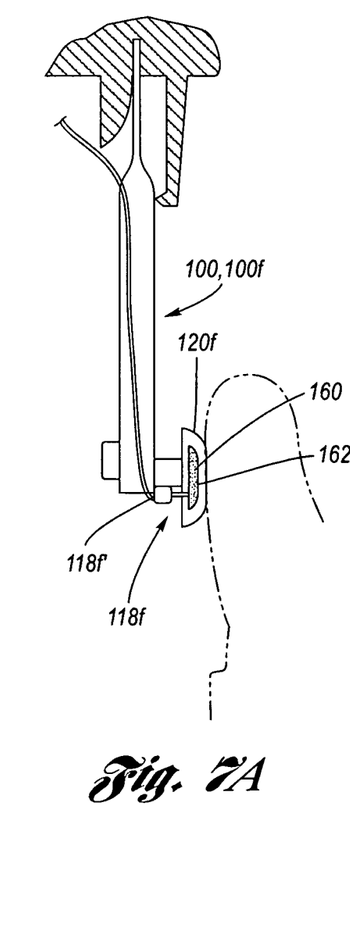
FIGS. 7A and 7B show schematic side views of a cantilever control arm according to the present invention in the form of a brake pedal, showing, respectively, diverse types and locations of sensors associated therewith.
Figure 7B:
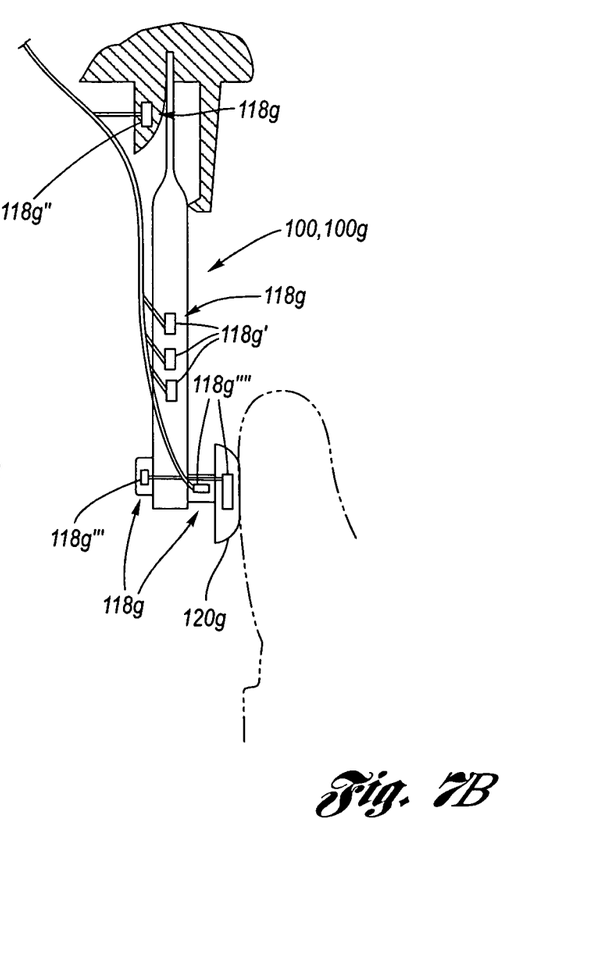

The diversity of sensors is further exemplified by FIGS. 7A and 7B. At FIG. 7A, a cantilever control system 100 in the form of a brake pedal 100f has a sensor 118f in the form of a pressure sensor 118f' which senses pressure of a fluid 160 in a fluid sack 162 of the foot pad 120f. At FIG. 7B, a cantilever control system 100 in the form of a brake pedal 102g has a plurality of sensors 118g of diverse types and disposed at diverse locations: a plurality of flexure sensors 118g' located at the rigid section 108g; a pressure sensor mounted in the stop control 118g", a pressure sensor 118g'" mounted in the snubber 110g, and one or more pressure sensors 118g'" in the foot pad 120g. The sensors may be, for example, in the form of any of strain gauges, tactile sensors, load cells (i.e., capacitive, magnetic, semi-conductor, piezo-electric, etc.).

Figure 8A:
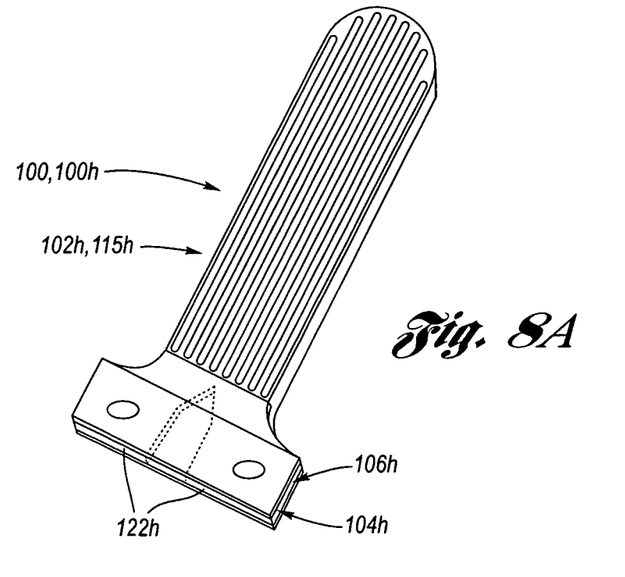
FIG. 8A is a top perspective view of the cantilever control system in the form of an accelerator pedal.
Figures 8B, 8C:
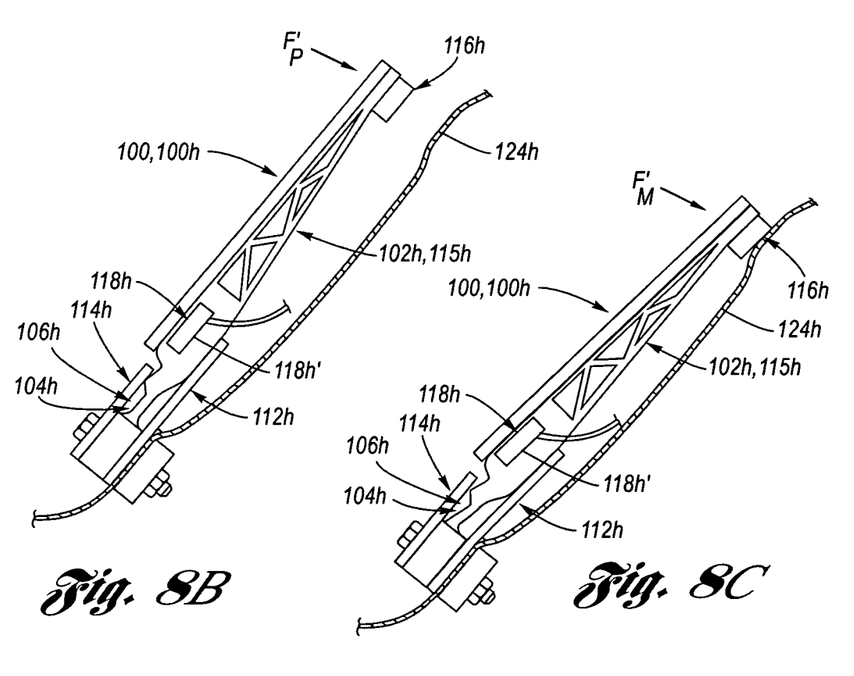
FIGS. 8B and 8C are side views of the accelerator pedal form of the cantilever control arm of FIG. 8A, illustrating flexure of the pedal lever in response to the application of force by a driver during the normal course of operation.
Figure 9:
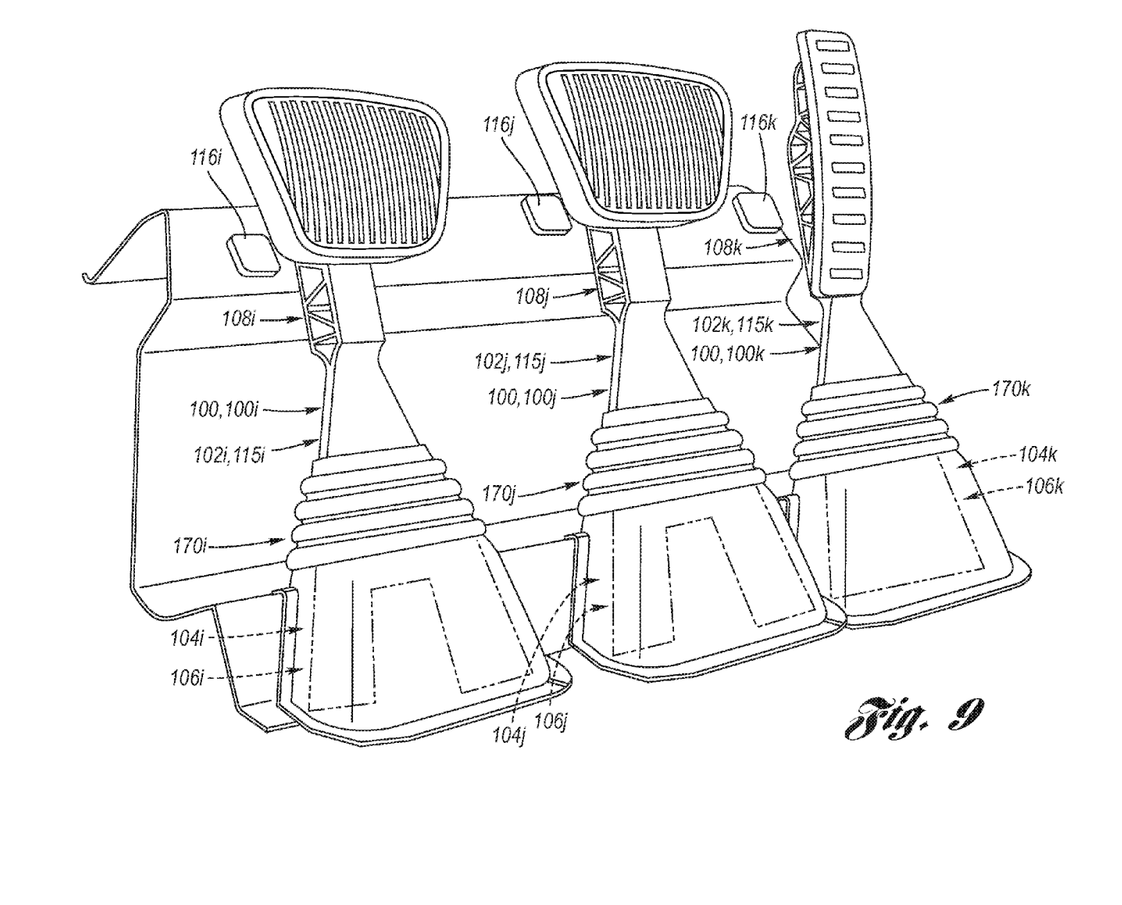
FIG. 9 is a schematic view of a cabin interior of a motor vehicle equipped with by-wire cantilever control systems according to the present invention for each of the clutch pedal, brake pedal and accelerator pedal.

As can be seen at FIGS. 8A through 9, the cantilever control system 100 may have other applications to motor vehicles in addition to brake pedals.

At FIGS. 8A through 8C, depicted is an example of a cantilever control system 100 in the form of an accelerator pedal 100h, wherein the cantilever control arm 102h is, in turn, in the form of a composite pedal lever 115h which is lower mounted to a stationary structure (i.e., floor mounting modality).

The pedal lever 115h (the cantilever control arm) has, preferably but not necessarily, a bifurcated section 104h, including a springy portion 106h, and a rigid section 108h. Fine flexure control is provided by a hysteresis control 112h, a preload control 114h, and a stop control 116h, operating as generally described hereinabove. In this regard, as shown at FIG. 8B, the preload control requires a minimum force $F_p'$ be applied before flexure of the springy portion 106h occurs; and, as shown at FIG. 8C, the stop control 116h provides an over travel abutment stop, which acts in conjunction with a stationary structure 124h, when the applied force reaches at least $F_M'$. Further, when provided, the bifurcated section 104h, provides two separated and mutually spaced apart legs 122h, each having its own separate attachment to a stationary structure 124h and each carrying a separate springy portion 106h, with the advantages as discussed above.

The cantilever control system 100 in the form of an accelerator pedal 102h further includes at least one sensor 118h for sensing the application of force to the accelerator pedal. While a diversity of sensors may be provided, FIGS. 2A and 2B depict, merely by way of example, a single strain gauge 118h' which is attached to, or embedded (i.e., overlmolded) in, the rigid section 108h.

FIG. 9 depicts an example of a set of cantilever control systems 100 in the form of: a clutch pedal 100i, wherein the cantilever control arm 102i thereof is, in turn, in the form of a composite clutch pedal lever 115i; a brake pedal 100j, wherein the cantilever control arm 102j thereof is, in turn, in the form of a composite brake pedal lever 115j; and an accelerator pedal 100k, wherein the cantilever control arm 102k thereof is, in turn, in the form of a composite accelerator pedal lever 115k, all of which being lower mounted to a stationary structure (i.e., floor mounting modality).

Each of the clutch and brake pedal levers 115i, 115j have, by way of example, a U-shaped bifurcated first section 106i, 106j, the accelerator pedal lever 115k has a (non-bifurcated) first section 106k, and each of the clutch, brake and accelerator pedal levers has a springy portion 104i, 104j, 104k located within boots 170i, 170j, 170k, and further each has a rigid section 108i, 108j, 108k, and may include any or all of the aforementioned and described coarse and fine flexure controls.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A cantilever control system, comprising:
 a cantilever control arm, comprising:
  a bifurcated first section comprising a pair of separate and mutually spaced apart legs, a springy portion of said arm being disposed at the legs of said bifurcated first section, said bifurcated section being adapted for connection to a stationary structure; and
  a second section connected in affixed relation to said bifurcated first section, wherein said second section is relatively rigid in comparison with said springly portion;
 at least one sensor disposed to sense flexure force applied to said second section of said cantilever control arm;
 a first flexure control of said cantilever control arm comprising a snubber having a snubber surface contour which abuttingly interfaces with a springy portion surface contour of said springy portion when said cantilever control arm is flexed to thereby provide a predetermined stiffness rate of flexure of said springy portion; and
 a second flexure control of said cantilever control arm comprising a hysteresis control, wherein said hysteresis control comprises a leaf disposed adjoining said cantilever control arm, wherein said leaf fictionally slides against said cantilever control arm during flexing of said springy portion.

2. The cantilever control system of claim 1, wherein said snubber surface contour is curved, the combination of said snubber and springy portion surface contours providing said predetermined stiffness rate of flexure of said springy portion.

3. The cantilever control system of claim 1, wherein said springy portion surface contour is curved, the combination of said snubber and springy portion surface contours providing said predetermined stiffness rate of flexure of said springy portion.

4. The cantilever control system of claim 1, wherein said cantilever control arm flexes between a neutral position and a maximum flexed position; and wherein said second flexure control of said cantilever control arm further comprises a preload control comprising an abutment abutting said cantilever control arm when at the neutral position thereof such that a predetermined preload force must be applied to said second section in order to commence flexure of the springy portion.

5. The cantilever control system of claim 1, wherein said cantilever control arm flexes between a neutral position and a maximum flexed position; and wherein said second flexure control of said cantilever control arm further comprises a stop control comprising a stop abutment of said cantilever control arm with respect to the stationary structure when flexure is at the maximum flexed position.

6. The cantilever control system of claim 1, wherein said at least one sensor comprises at least one sensor disposed at at least one of said second section and said snubber.

7. The cantilever control system of Claim 1, further comprising a foot pad connected to said second section; wherein said at least one sensor comprises a plurality of sensors, at least one sensor being disposed at at least one of said second section, said snubber, and said foot pad.

8. The cantilever control system of claim 7, wherein the at least one sensor disposed at said foot pad comprises:
 a fluid filled sack in said foot pad; and
 a fluid pressure sensor sensing fluid pressure in said fluid filled sack.

9. The cantilever control system of claim 1, wherein said cantilever control arm comprises a brake pedal; further comprising:
 said second flexure control of said cantilever control arm further comprising at least one of a preload control and a stop control;
 a foot pad connected to said second section; and
 said at least one sensor comprising at least one sensor disposed at at least one of said second section, said snubber, and said foot pad.

10. The cantilever control system of claim 9, wherein the at least one sensor disposed at said foot pad comprises:
 a fluid filled sack in said foot pad; and
 a fluid pressure sensor sensing fluid pressure in said fluid filled sack.

11. The cantilever control system of claim 9, wherein:
 said cantilever control arm flexes between a neutral position and a maximum flexed position;
 said preload control comprises an abutment abutting said cantilever control arm when at the neutral position thereof such that a predetermined preload force must be applied to said second section in order to commence flexure of the springy portion; and
 said stop control comprises a stop abutment of said cantilever control arm with respect to the stationary structure when flexure is at the maximum flexed position.

12. The cantilever control system of claim 1, wherein said cantilever control arm comprises a hand lever; further comprising:
 said first flexure control of said cantilever control arm further comprising another said snubber, each said snubber being disposed at a respectively opposite side of said cantilever control arm, each said snubber having a surface contour which abuttingly interfaces with respective surface contours of said springy portion when said cantilever control arm is flexed respectively theretoward to thereby provide a predetermined stiffness rate of flexure of said springy portion;
 said second flexure control further comprising another leaf, each said leaf being disposed adjoining said cantilever control arm at respectively opposite sides thereof, wherein each said leaf fictionally slides against said cantilever control arm during flexing of said springy portion; and
 said at least one sensor comprising at least one sensor disposed at at least one of said second section and said pair of snubbers.

13. The cantilever control system of claim 12, further comprising a stationary structure; wherein:
 said cantilever control arm flexes between a neutral position, a first maximum flexed position on one side of said neutral position and a second maximum flexed position on the opposite side of said neutral position;
 said hysteresis control comprises a pair of leafs, each leaf disposed adjoining said cantilever control arm on an opposing side thereof, wherein a respective leaf fictionally slides against said cantilever control arm during flexing theretoward of said springy portion; and
 said stop control comprises a pair of stop abutments of said cantilever control arm with respect to the stationary structure when flexure is at the respective first and second maximum flexed positions with respect thereto.

14. A cantilever control system, comprising:
 a cantilever control arm, comprising:
  a bifurcated first section comprising a pair of separate and mutually spaced apart legs, said legs having a springy portion, said bifurcated first section being adapted for connection to a stationary structure; and
  a second section connected in affixed relation to said bifurcated first section, wherein said second section is relatively rigid in comparison with said springly portion;
 at least one sensor disposed to sense flexure force applied to said second section of said cantilever arm; and
 a first flexure control of said cantilever control arm comprising a snubber having a snubber surface contour which abuttingly interfaces with a springy portion surface contour of said springy portion when said cantilever control arm is flexed to thereby provide a predetermined stiffness rate of flexure of said springy portion;
 wherein said snubber surface contour is curved, the combination of said snubber and springy portion surface contours providing said predetermined stiffness rate of flexure of said springy portion.

15. The cantilever control system of claim 14, wherein said cantilever control arm comprises a brake pedal composed of a composite.

16. The cantilever control system of claim 14, wherein said cantilever control arm comprises a brake pedal composed of metal.

17. A cantilever control system, comprising:
 a cantilever control arm, comprising:
  a first section having a springy portion, said first section being adapted for connection to a stationary structure; and
  a second section connected with said springy portion, wherein said second section is relatively rigid in comparison with said springly portion;
 at least one sensor disposed to sense flexure force applied to said second section of said cantilever control arm;
 a first flexure control of said cantilever control arm comprising a snubber having a surface contour which abuttingly interfaces with a surface contour of said springy portion when said cantilever control arm is flexed to thereby provide a predetermined stiffness rate of flexure of said springy portion; and
 a second flexure control of said cantilever control arm comprising a hysteresis control, a preload control and a stop control, wherein said hysteresis control comprises a leaf disposed adjoining said cantilever control arm in parallel juxtaposed relation thereto, wherein said leaf frictionally slides against said cantilever control arm during flexing of said springy portion.

18. The cantilever control system of claim 17, wherein said cantilever control arm flexes between a neutral position and a maximum flexed position; and
    wherein said preload control comprises an abutment abutting said cantilever control arm when at the neutral position thereof such that a predetermined preload force must be applied to said second section in order to commence flexure of the springy portion.

19. The cantilever control system of claim 17, wherein said cantilever control arm flexes between a neutral position and a maximum flexed position; and
    wherein said stop control comprises a stop abutment of said cantilever control arm with respect to the stationary structure when flexure is at the maximum flexed position.

20. The cantilever control system of claim 17, wherein said at least one sensor comprises at least one sensor disposed at at least one of said second section and said snubber.

21. The cantilever control system of claim 17, wherein said cantilever control arm comprises a brake pedal; further comprising a foot pad connected to said second section; wherein said at least one sensor comprises a plurality of sensors, at least one sensor being disposed at at least one of said second section, said snubber, and said foot pad.

22. The cantilever control system of claim 21, wherein the at least one sensor disposed at said foot pad comprises:
    a fluid filled sack in said foot pad; and
    a fluid pressure sensor sensing fluid pressure in said fluid filled sack.

23. The cantilever control system of claim 17, wherein said cantilever control arm comprises a hand lever; said first flexure control of said cantilever control arm comprising a pair of said snubbers disposed at opposite sides of said cantilever control arm, each snubber having a surface contour which abuttingly interfaces with respective surface contours of said springy portion when said cantilever control arm is flexed respectively theretoward to thereby provide a predetermined stiffness rate of flexure of said springy portion.

24. The cantilever control system of claim 23, wherein:
    said cantilever control arm flexes between a neutral position, a first maximum flexed position on one side of said neutral position and a second maximum flexed position on the opposite side of said neutral position;
    said hysteresis control comprises a pair of leafs, each leaf disposed adjoining said cantilever control arm on an opposing side thereof, wherein a respective leaf fictionally slides against said cantilever control arm during flexing theretoward of said springy portion; and
    said stop control comprises a pair of stop abutments of said cantilever control arm with respect to the stationary structure when flexure is at the respective first and second maximum flexed positions with respect thereto.

* * * * *